April 2, 1963     T. L. SMITH ET AL     3,083,914
ADJUSTABLE LAWN SPRINKLER
Filed Oct. 25, 1961
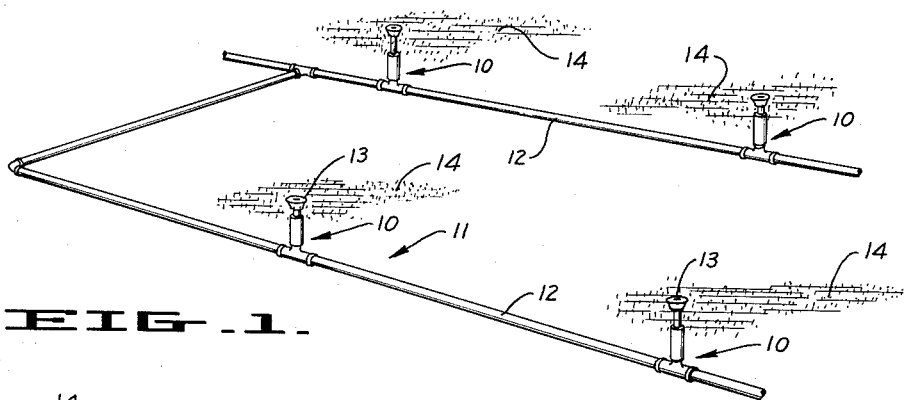
FIG. 1.
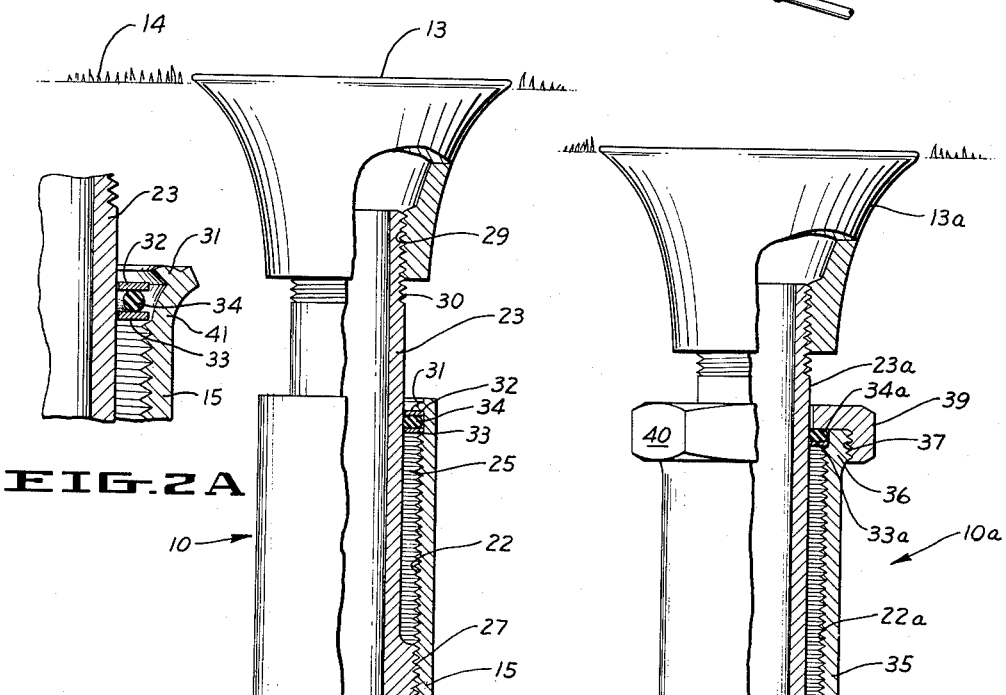
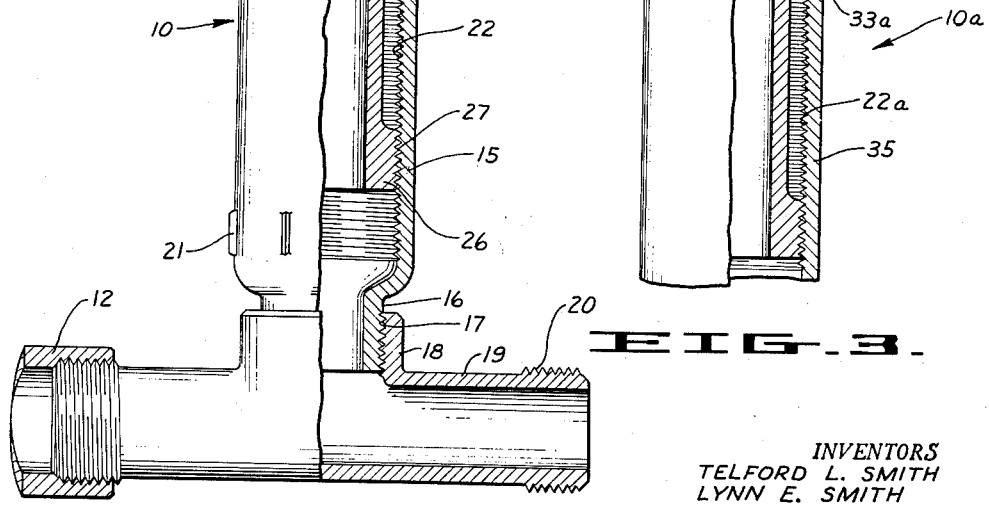
FIG. 2A.
FIG. 3.
FIG. 2.
INVENTORS
TELFORD L. SMITH
LYNN E. SMITH
BY
ATTORNEY

United States Patent Office 3,083,914
Patented Apr. 2, 1963

3,083,914
ADJUSTABLE LAWN SPRINKLER
Telford L. Smith and Lynn E. Smith, Los Altos, Calif.
(both of 336 Rider Road, Watsonville, Calif.)
Filed Oct. 25, 1961, Ser. No. 147,553
4 Claims. (Cl. 239—203)

This invention relates to permanently installed ground sprinkling systems for lawns and the like, and more particularly it relates to an adjustable sprinkler outlet for such systems.

Lawn sprinkler systems that are permanently installed below the ground level have many advantages, primarily, because they provide a tremendous saving in labor, and secondly, because when properly installed they can provide thorough and uniform watering over large areas. Such systems are generally installed with a network of pipe or some suitable conduit buried in the earth and connected to a series of individual sprinklers. One problem with permanent sprinkler installations prior to the present invention was that after being installed, the level of the ground around the sprinklers would settle, or on some occasions heave upward, and this would cause the nozzle ends of the sprinklers to be exposed above the ground level or buried below it. The problem was especially severe with the installation of new lawns where a great deal of settling occurred after the lawn was in. In planting new lawns it is almost impossible to predict with accuracy that exact level of the ground after all settling and soil consolidation has taken place. Moreover, as the lawn progresses in growth, the turf is apt to grow up around the sprinkler openings. Yet, it is essential that the sprinkler openings be located at just the right level along the ground, because if they are up too high they will interfere with the cutting of the grass and if they sink too low they may become clogged and ineffective.

It is therefore a principal object of the present invention to provide a sprinkler device for a permanent sprinkler system that is easily adjustable in height so that the outlet end of the sprinkler can be fixed at the proper level relative to the ground without disturbing the conduit line to which it is attached.

Another object is to provide a sprinkler device for a conduit system whose outlet end can be adjusted in height relative to the conduit to which it is attached by turning the sprinkler at its outlet end.

Still another object of the present invention is to provide an adjustable sprinkler device for a permanent ground sprinkler system that is inexpensive to manufacture.

A particular problem that has been solved by the present invention is that of preventing leakage in the sprinkler device while simultaneously providing the adjustable feature. Our invention provides a novel arrangement of elements that assures a fluid-tight seal for long periods of time even though the sprinkler devices are buried in the ground and subject to the usual deterioration factors.

Other objects, advantages and features of the invention will appear from the following detailed description of some preferred embodiments thereof.

In the drawings:

FIG. 1 is a view in perspective of a typical permanent type ground sprinkler system;

FIG. 2 is a view in elevation and partly in section showing one preferred form of adjustable sprinkler device embodying the principles of the present invention;

FIG. 2a is an enlarged fragmentary view in elevation and in section of the upper end of the sprinkler of FIG. 2, showing the installation of the sealing means;

FIG. 3 is a view in elevation and partly in section of a portion of a slightly modified form of sprinkler device.

In FIG. 1, a series of sprinkler devices 10 in accordance with the principles of the invention are shown arranged in a permanent lawn sprinkling system 11. As shown, such a system 11 may comprise a plurality of sprinkler devices 10, arranged at predetermined locations and distances apart and connected by conduit lines 12 of any suitable type. Such a sprinkling system may be installed when the lawn is first graded and planted, or it may be installed in a mature lawn. In either instance, the novel adjustable feature of the sprinkler device 10 allows its outlet end or nozzle head 13 to be raised or lowered so that it can be brought up exactly flush with the ground or grass level 14. Moreover, any time after the installation of the sprinkler system 11, the individual sprinkler devices 10 can be quickly and easily readjusted to their desired level.

One preferred form of our sprinkler device 10 is shown in detail in FIG. 2 and comprises a cylindrical outer sleeve member 15 having a necked down portion 16 at its lower end. The end portion 16 has a series of external threads 17 and is adapted to be connected to the internally threaded center nipple 18 of a T-shaped fitting 19. Each threaded end 20 of the T-shaped fitting 19 is connected to a conduit section 12. It is necessary that the threaded connections of the member 15 and the conduit sections 12 with the T-shaped fitting 19 be permanent, so the clearance at these threaded connections between these members is provided accordingly. In order to assure a tight fit between the T-fitting 19 and the member 15 during the installation of the sprinkler device 10, a series of gripping projections 21 may be provided on the outer surface of the member 15 above the end portion 16.

It is to be understood, of course, that our sprinkling device 10 is not limited for use with only a T-shaped fitting, but it may be used with any type of standard pipe fitting that would be suitable for underground sprinkler systems. This includes side outlet "El" or cross fittings or any similar fitting having a properly threaded end.

The main inner bore of the sleeve member 15 comprises a series of threads 22 that extend from above the necked down end portion to near its upper end and which provide thereby the adjustable travel for the nozzle 13. An inner sleeve member 23 having a smooth bore 24 is movable axially within the sleeve member 15. The inner sleeve member 23 has a substantially uniform diameter for the greater portion of its length that is smaller than the diameter of the internal threads 22 of the member 15 so that the outer surface of the sleeve member 23 forms a sizable annular clearance 25 with the member 15. At the lower end of the inner sleeve member 23 is an end portion 26 having a larger diameter and a series of external threads 27 that are adapted to provide a relatively loose sliding fit with the threads 22 of the sleeve 23. Thus by exerting only a moderate amount of torque on the inner sleeve 23, it can be made to turn and move axially within the outer sleeve 15. To the upper end of the inner sleeve 23 is attached the sprinkler head designated by the number 13. Any one of several well known types of sprinkler heads can be used on my sprinkler device, and each having generally, a diverging annular shape with a suitable form of centrally located spray producing device. Since the latter forms no part of the present invention it is not shown; the sprinkler head 13 being representative only. Preferably, the sprinkler head 13 has internal threads 29 that connect with a series of external tapered pipe threads 30 on the upper end of the inner sleeve 23 to form a firm, tight union.

To effect a fluid-tight seal between the inner and outer sleeves 23 and 15, as shown in FIG. 2, an inwardly extending lip 31 is formed around the upper peripheral edge of the outer sleeve 15. The lip 31 serves to retain a pair of washers 32 and 33 between an O-ring 34. The upper washer 32 is seated against the lip 31 and the lower washer 33 rests on the uppermost of the internal threads 22 and provides a uniform pressure against the O-ring that serves to flatten it and press it against the sides of the sleeves 15 and 23. Any water that is forced into the annular clearance 25 is retained by virtue of the aforesaid sealing structure and this sealing is maintained throughout the entire travel of the sleeve 23.

In making the sprinkler device 10, the outer sleeve 15 is preferably cast from some suitable malleable metal such as ductile iron or bronze and is originally formed with a flared upper end 41 as shown in FIG. 2a. Thus, when the device is assembled, the inner sleeve 23 is screwed into the sleeve 15, the washer 33, the O-ring 34, and the washer 32 are placed in position, and then the flared end 41 is pressed inward so that the lip 31 engages the upper washer 32 and retains it against the O-ring 34, thus permanently encasing the sealing means between the sleeves 15 and 23.

Other modified forms of sealing means may be devised within the scope of the invention and in FIG. 3, I have shown one such alternate form of sprinkling device 10a. Here, a fixed outer sleeve 35 has an upper end portion 36 with an increased diameter and a series of external threads 37. The inner bore 38 is threaded internally in the same manner as the fixed outer sleeve 15 of the sprinkler device 10. A collar member 39, preferably provided with flat sides 40 to facilitate its installation, is threaded to the end portion 36 of the fixed outer sleeve 35. The collar member 39 has an inwardly extending annular portion 41 that fits around the inner sleeve 23a with a substantial clearance and serves to retain an O-ring 34a. A lower washer 33a is placed between the O-ring 34a and the internal threads 22a of the outer sleeve member 35 in order to apply uniform pressure to the O-ring in the manner stated above.

In either of the above described embodiments of the invention, the sprinkler devices 10 or 10a may be constructed from any suitable material commonly used for conduit fittings, taking into account the corrosive effect of moisture and the soils in which the devices will be embedded.

It is believed that the function and operation of our sprinkler device will be apparent from a consideration of the foregoing description. However, briefly it may be stated that each sprinkler device 10 or 10a is rigidly connected to a T-fitting 19 (or to an "El" fitting or a side outlet "El" fitting or a side outlet cross) in a conduit system 11, the inner sleeve 23 having been threaded into the outer sleeve 15. When the lawn grade has been established, and the sprinkler head 13 requires raising or lowering, the inner sleeve 23 can be easily turned because of the large amount of clearance between the threads 22 of the outer sleeve 15 and the threads 22 of the inner sleeve 23. The water pressure which penetrates upward in the annular clearance 25 presses against the washer 33, deforming the O-ring 34, so that a fluid-tight seal is formed between the inner and outer sleeve members 23 and 15.

It will be obvious to those skilled in the art that our invention may be modified by many substitutions and equivalents, and this disclosure is intended to be illustrative only. Therefore, we intend to be limited solely by the scope of the appended claims.

We claim:

1. In a lawn sprinkling system having an underground conduit supplied by water under pressure an adjustable height sprinkler device connected to said conduit and adapted to be extended upward therefrom toward the ground level, comprising: an outer tubular member rigidly attached to said conduit and having a series of internal threads on its inner wall; an inner tubular member with an enlarged portion of an increased diameter at its lower end and a series of external threads on said enlarged portion, said inner and outer tubular members being connected together by said threads, so that said inner tubular member is axially movable within said outer tubular member; a sprinkler head attached to the upper end of said inner sleeve member; and sealing means for providing a fluid-tight seal between said inner and outer tubular members including an inwardly extending lip portion on the upper end of said outer tubular member; an annular washer retained between said lip portion and the uppermost of said internal threads on said outer sleeve member; an O-ring adjacent said lip portion and retained by said washer, said washer being adapted to apply a uniform axial force on said O-ring to press it tightly against said inner and outer tubular members thereby effecting a fluid-tight seal in response to the water pressure in said conduit; whereby said O-ring assumes its normal shape when the water pressure is removed to facilitate the ease of adjustment of said inner tubular member within said outer tubular member.

2. In a lawn sprinkling system having an underground conduit supplied by water under pressure an adjustable height sprinkler device connected to said conduit and adapted to be extended upward therefrom toward the ground level, comprising: an outer tubular member rigidly attached to said conduit and having a series of internal threads on its inner wall; an inner tubular member with an enlarged portion of an increased diameter at its lower end and a series of external threads on said enlarged portion, said inner and outer tubular members being connected together by said threads, so that said inner tubular member is axially movable within said outer tubular member; a sprinkler head attached to the upper end of said inner sleeve member; and sealing means for providing a fluid-tight seal between said inner and said outer tubular members including an integral inwardly extending peripheral retaining member on the upper end of said outer sleeve member; a pair of washers between said retaining member and the uppermost of said internal threads on said outer sleeve member; an O-ring between said washers adapted to be pressed tightly against said inner and outer sleeve members to effect a fluid-tight seal in response to fluid pressure on the lowermost washer; whereby said O-ring assumes its normal shape when the water pressure is removed to facilitate the ease of adjustment of said inner tubular member within said outer tubular member.

3. In a lawn sprinkling system having an underground conduit supplied by water under pressure an adjustable height sprinkler device connected to said conduit and adapted to be extended upward therefrom toward the ground level, comprising: an outer tubular member rigidly attached to said conduit and having a series of internal threads on its inner wall; an inner tubular member with an enlarged portion of an increased diameter at its lower end and a series of external threads on said enlarged portion, said inner and outer tubular members being connected together by said threads, so that said inner tubular member is axially movable within said outer tubular member; a sprinkler head attached to the upper end of said inner sleeve member; and sealing means for providing a fluid-tight seal between said inner and said outer tubular members including a collar member threaded to the upper end of said outer sleeve, said collar having an inwardly extending lip portion forming an annular seat around said inner sleeve; an annular washer around said inner sleeve adjacent the uppermost of said internal threads on said outer sleeve; an O-ring within said seat between said washer and said inwardly extending portion of said collar, said O-ring being adapted to deform slightly and to effect a fluid-tight seal between said sleeve members in response to fluid pressure on said washer; whereby said O-ring assumes its normal shape when the water pressure is removed to facilitate the ease of adjustment of said inner tubular member within said outer tubular member.

4. In a lawn sprinkling system having an underground conduit supplied by water under pressure an adjustable height sprinkler device connected to said conduit and adapted to be extended upward herefrom toward the ground level, comprising: an outer tubular member rigidly attached to said conduit and having a series of internal threads on its inner wall; an inner tubular member with an enlarged portion of an increased diameter at its lower end and a series of external threads on said enlarged portion, said inner and outer tubular members being connected together by said threads, so that said inner tubular member is axially movable within said outer tubular member; a sprinkler head attached to the upper end of said inner sleeve member; and sealing means for providing a fluid-tight seal between said inner and said outer tubular members including an inwardly extending lip portion on the upper end of said outer tubular member; an annular pressure distribution member retained between said lip portion and the uppermost of said internal threads on said outer sleeve member; an O-ring adjacent said lip portion and retained by said pressure distribution member, said pressure distribution member being adapted to apply a uniform axial force on said O-ring to press it tightly against said inner and outer tubular members thereby effecting a fluid-tight seal in response to the water pressure in said conduit; whereby said O-ring assumes its normal shape when the water pressure is removed to facilitate the ease of adjustment of said inner tubular member within said outer tubular member.

References Cited in the file of this patent

UNITED STATES PATENTS

| | | |
|---|---|---|
| 1,833,040 | Rader | Nov. 24, 1931 |
| 2,968,440 | Cone | Jan. 17, 1961 |

FOREIGN PATENTS

| | | |
|---|---|---|
| 55,054 | Netherlands | Aug. 16, 1943 |